April 4, 1961

L. J. B. LA COSTE 2,977,799

FORCE MEASURING APPARATUS

Filed Sept. 23, 1955

Lucien J. B. LaCoste
INVENTOR.

BY Vincent Martin
Jos E. Edwards
B. R. Pravel
ATTORNEYS

April 4, 1961  L. J. B. LA COSTE  2,977,799
FORCE MEASURING APPARATUS
Filed Sept. 23, 1955  4 Sheets-Sheet 3

Lucien J. B. LaCoste
INVENTOR.
BY Vincent Martin
Jos E. Edwards
B. R. Pravel
ATTORNEYS United States Patent Office 2,977,799
Patented Apr. 4, 1961

2,977,799

FORCE MEASURING APPARATUS

Lucien J. B. La Coste, Austin, Tex., assignor to La Coste & Romberg, Austin, Tex., a partnership Filed Sept. 23, 1955, Ser. No. 536,062

17 Claims. (Cl. 73—382)

This invention relates to new and useful improvements in force-measuring apparatus and relates particularly to an apparatus for the measurement of forces which undergo considerable fluctuation during the time required for measurement. An important application of the invention is its use as a gravity meter in a submerged submarine.

Heretofore the obtaining of gravity meter readings at sea where a steady base for the instrument is not available, has been accomplished either by lowering a remote controlled gravity meter to the bottom of the ocean or by utilizing a pendulum assembly which is mounted in a submerged submarine. The remote controlled gravity meter method has its limitations because the necessary use of cables limits the depths at which readings can be taken; the pendulum method is not as accurate as the gravity meter and also requires an enormous amount of calculation to determine the gravity reading from the pendulum data.

It is, therefore, one object of this invention to provide a force-measuring apparatus which will accurately measure gravitational force while mounted in a submerged submarine, whereby accurate gravity readings may be taken at sea.

An important object is to provide an improved force-measuring apparatus which is extremely accurate in its measurements even when there are very great fluctuations in the force being measured.

In order to provide a force-measuring apparatus which is adaptable for use in a submarine, it is desirable to damp the apparatus greatly beyond critical damping so as to reduce the possibility of interference between the moving and stationary parts of said apparatus which would adversely affect accuracy; however, such overdamping results in a very slow reading when any presently known reading methods are employed, and it is therefore another important object of this invention to provide an entirely new and novel method of reading an overdamped force-measuring apparatus which is both accurate and rapid.

A particular object of the invention is to provide an improved averaging apparatus which makes possible the rapid and accurate measurement of the gravitational force acting upon the gravity-responsive element of a gravity meter apparatus; said apparatus being particularly efficient and being primarily adaptable for use with a gravity-responsive element which is highly damped.

Another object is to provide a gravity meter apparatus, of the character described, having an improved suspension arrangement for the gravity-responsive element whereby the engine vibrations of the submarine will not interfere with proper and efficient operation of the unit.

Still another object is to provide improved means for obtaining high damping in a gravity meter and also means for effecting a rapid movement of the gravity-responsive element of the apparatus in spite of said high damping whenever such rapid movement is desirable.

A still further object is to provide an analogue computer for performing the calculations required in the new method of reading an overdamped force-measuring instrument.

Another important object is to provide an apparatus for obtaining accurate gravity meter readings in an overdamped meter from a time record of the changes which occur in the torque in the suspension mounting of the gravity responsive element and a time record of the position of said element, whereby such records, which are representative of the gravitational force acting upon the element, may be utilized to simply and rapidly calculate the actual accurate gravity readings.

Other objects will hereinafter appear.

The construction designed to carry out the invention will be hereinafter described, together with other features thereof.

The invention will be more readily understood from a reading of the following specification and by reference to the accompanying drawings forming a part thereof, wherein an example of the invention is shown and wherein.

The problems involved in making a gravity meter that will operate satisfactorily in a submerged submarine are similar to the problems involved in making a remote controlled gravity meter that will operate when lowered to rest on a muddy ocean bottom. In both cases the main difficulty is motion of the base on which the gravity meter rests; the motion in a submarine of course is much greater than the motion on a muddy ocean bottom. In a submerged submarine the amplitude of motion is often as much as a foot, while on a muddy bottom the seismic motion is seldom over ⅛". The period of the submarine motion is generally between 4 and 20 seconds.

Because of the similarity in the requirements for a submarine gravity meter and for a remote controlled underwater gravity meter, it may appear to be feasible to construct a submarine gravity meter according to the design given in prior Patents No. 2,589,709 and No. 2,589,710 relating to underwater gravity meters. These patents disclose the use of an elevator to compensate for motion of the base on which the gravity meter rests; the use of such elevator involves some difficulty in the case of a submarine gravity meter because the motion is often as much as a foot, and this requires an elevator with a travel of more than a foot. Such an elevator might be satisfactorily made, but since space is at such a premium in a submarine, this method is not too practical.

The basis of the present invention contemplates greatly overdamping the movable element of the gravity meter to limit the motion of the movable system to the amount required to make elastic hysteresis errors negligible. The use of such overdamping would normally make the gravity meter too slow-reading to be of any commercial value, but the invention herein disclosed overcomes this disadvantage by providing an improved reading method. The combination of overdamping with the new reading method results in a gravity meter which is simpler in construction and operation than the elevator type previously mentioned. Although the invention will be described herein as a submarine gravity meter, the invention is readily applicable to the usual remote controlled underwater gravity meters.

Figure 1:
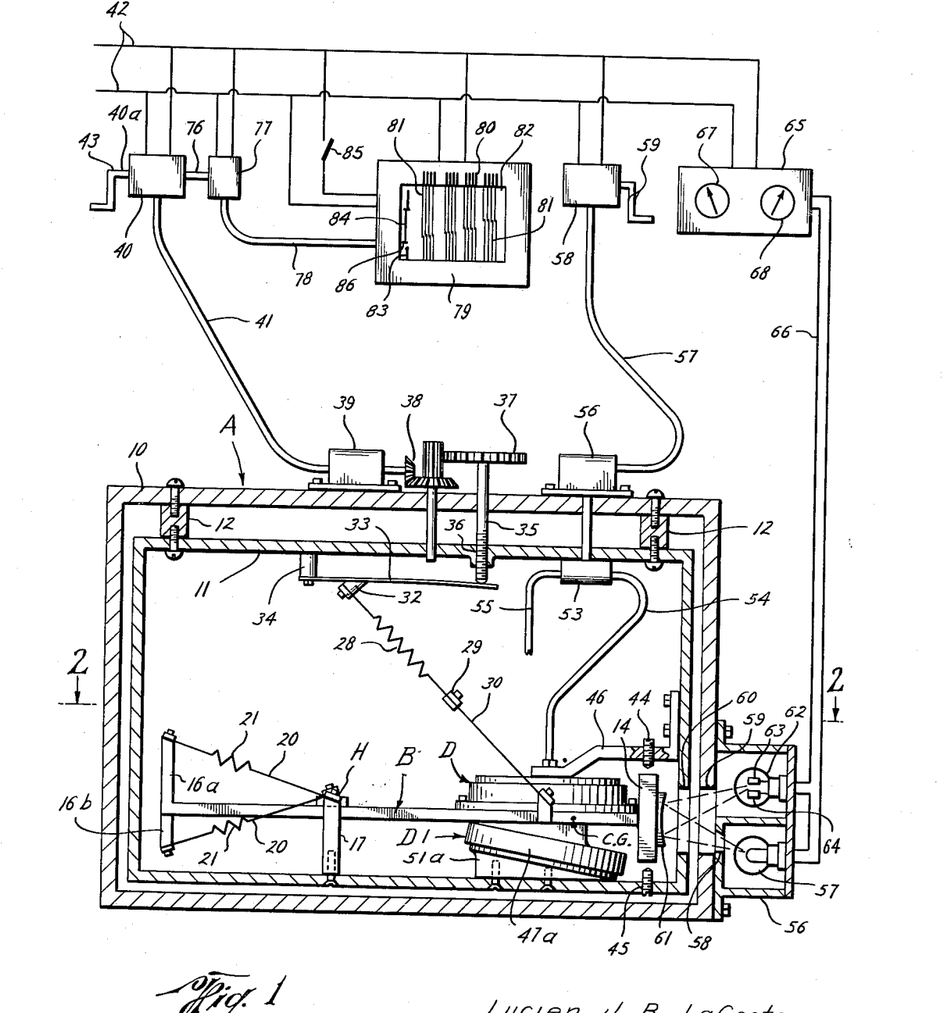
Figure 1 is a view partly in section and partly in elevation of a gravity meter apparatus, constructed in accordance with the invention and illustrating the preferred form of associated recording equipment.
Figures 2, 3, 4:
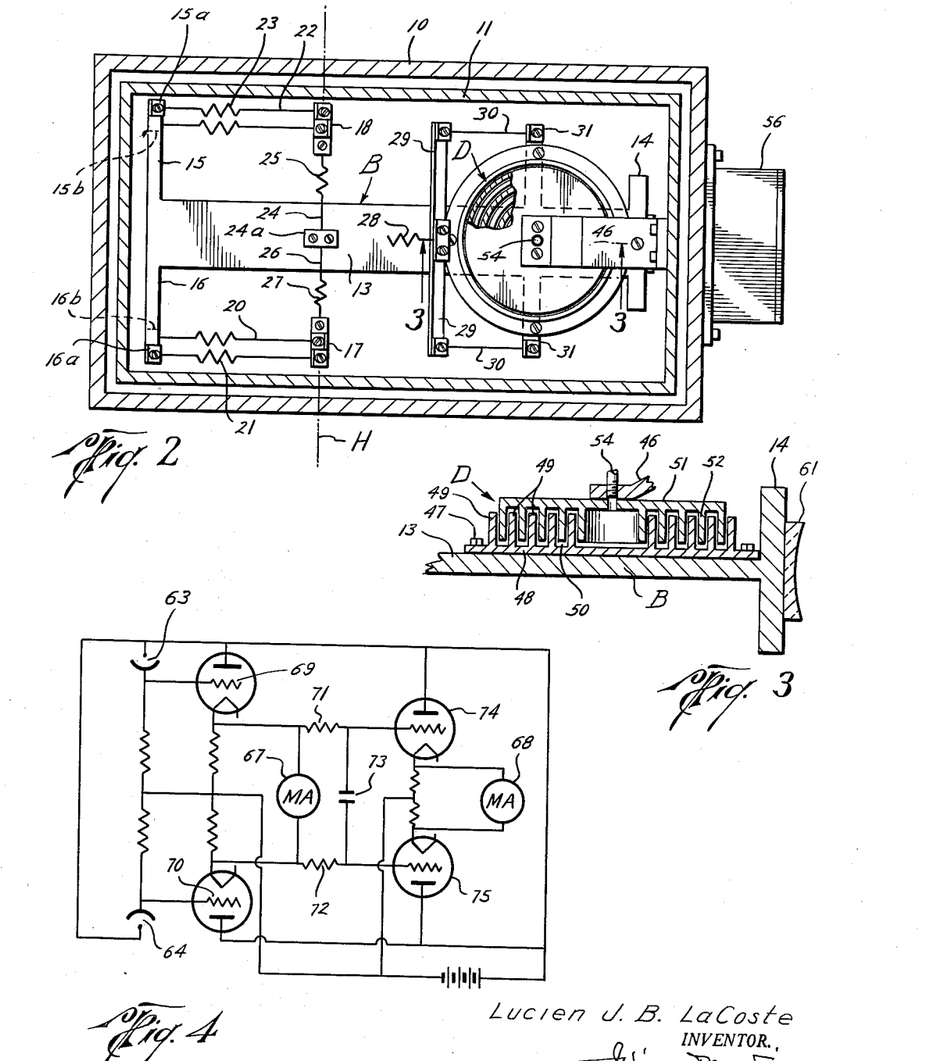
Figure 2 is a horizontal, cross-sectional view taken on the line 2—2 of Figure 1.
Figure 3 is a vertical, sectional view, taken on the line 3—3 of Figure 2.
Figure 4 is a wiring diagram of an electrical circuit for averaging the gravity meter beam position.

In the drawings, the letter A generally designates a gravity meter and includes an outer casing 10 and an inner casing 11. The inner casing is disposed within the outer casing and is connected thereto by heat insulating spacers 12. An inertia element or beam B is suspended within the inner casing and is responsive to gravitation force. As shown in Figures 1 and 2, the beam B comprises an elongate bar 13 which is disposed to extend longitudinally within the central lower portion of the inner casing 11. A weight 14 is secured to one end of the beam, while the opposite end of the beam is formed within laterally extending arms 15 and 16. The arm 15 has an upright post 15a and depending post 15b, while the arm 16 is also formed with similar upright and depending posts 16a and 16b.

For suspending the beam B for movement about a horizontal axis, upright supports 17 and 18 extend upwardly from the bottom of the inner casing 11 and are located on each side of the beam in substantial alignment with the upright and depending posts 15a, 15b, 16a and 16b. Suspension tension members 20, which include springs 21, extend from the support 17 to the posts 16a and 16b, while similar suspension tension members 22, having springs 23 therein, extend between the support 18 and the posts 15a and 15b. An additional tension member 24, which includes a spring 25 (Figure 2), connects the support 18 with a central projection 24a secured to the central portion of the beam, while still another tension member 26, having a spring 27 therein, connects said block with the other upright support 17. The points at which the tension members are clamped to the upright supports 17 and 18 are substantially in a straight line, transversely of the casing, in order to provide a horizontal axis of rotation H for the beam B. The projections 15a, 15b, 16a, 16b and 24a are spaced to make the tension members 20, 22, 24 and 26 extend in substantially different directions from the beam so as to prevent practically all motion of the beam except rotation about the axis H; the springs of the various tension members are preferably made fairly stiff in order to accomplish this purpose.

The weight of the beam B is so disposed as to locate its center of gravity considerably to the right in Figure 1 of the axis of rotation H, and such center of gravity is indicated by the point C—G. The torque produced by gravity acting at the center of the gravity of the beam is balanced by a spring 28, which has one end connected to a cross-arm 29. The cross-arm has its ends connected through wires 30 with outwardly extending arms 31 formed on the beam B. The other end of spring 28 is clamped to a projection 32 which is formed on the underside of a leaf spring 33; the leaf spring has one end secured to a projection 34 formed within the inner casing 11, while the free end of said leaf spring is engaged by the lower end of an adjusting screw 35 which is threaded through an opening 36 in the inner casing. The outer end of the screw 35 has a gear 37 which is connected through a suitable pinion and gear train 38 with a selsyn motor 39. The selsyn motor 39 is electrically connected to a driving selsyn 40 through a suitable cable 41. Power lines 42, which extend from a suitable source of power, are electrically connected to the selsyn motors 40 and 39.

The driving selsyn 40 is provided with a control crank 43, and when this crank is rotated on the driving selsyn the follow-up selsyn 39 will be actuated to impart a rotation to the screw 35, which is proportional to the rotation of the control crank 43. It is obvious that when the screw 35 is adjusted the leaf spring 33 undergoes a movement which causes a movement of the projection 32 to which the upper end of the spring 28 is connected, whereby the tension on the spring 28 will be varied.

For simplicity, the leaf spring 33 is illustrated as the means for varying the tension on spring 28 rather than a lever system as shown in Patent No. 2,377,889; it is noted that from a practical standpoint the lever system is preferable but is omitted since it forms no part of the present invention.

The spring 28 and the position of the projection 32 are adjusted to make the position of the beam B extremely sensitive to small changes in gravity that is, the gravity meter is adjusted for extremely high displacement sensitivity. It is pointed out that the beam and its mounting is similar to the gravity meter which is described in my previous Patent No. 2,293,437, and that preferably the spring 28 is a zero length spring, as disclosed in said patent. However, the present arrangement provides additional supporting springs which are arranged in a slightly different manner so that the motion of the beam is almost completely restricted to oscillation about the axis H. By suspending the beam by means of the tension members which are yieldable in length under impact, the beam is supported for sensitive response to the gravitational force acting thereon.

One of the important features of this invention is the use of a large amount of damping. For good results, when the device is used in a submerged submarine, the meter should have many times greater than critical damping. Critical damping is defined as the minimum damping required to prevent a movable element from overshooting or passing its equilibrium position when it is displaced from such equilibrium position and allowed to return to such position. If the system has much less damping than critical, it will require a long time to settle down to its equilibrium position because it will oscillate several times about such position before finally stopping. On the other hand, if a system has much more than critical damping, it will take considerable time to reach equilibrium position because of the fact that the damping slows its motion. For these reasons it has been heretofore considered that a damping close to critical is desirable. As will be explained in detail, the present device permits many times critical damping to be employed so that actually the beam is overdamped and yet accurate and rapid readings may be obtained. Although it is difficult to provide any specific numerical figures as to what constitutes "many times critical damping," experience has shown that satisfactory results are not obtainable if the damping is only twice critical; beginning with three times critical damping improved results will be obtained but from the practical standpoint, the damping should be at least five times critical damping.

The particular advantage of overdamping is that the apparatus becomes applicable for use in a submerged submarine or in any environment where the motion is of relatively high amplitude. Obviously, overdamping reduces the possibility of interference between the stationary and movable parts of the apparatus.

The beam B is suspended as hereinabove described and is adapted to oscillate about the horizontal axis H. Oscillation of the beam is limited with respect to the inner casing by means of stop screws 44 and 45. The screw 44 is adjustably mounted within a bracket 46 secured within the inner casing 11, while the stop screw 45 is adjustable within the bottom of said casing. By overdamping the motion of the beam B, the motion of the submarine will not cause the beam to oscillate to the point where the weight 14 will engage one of the stops.

It is recognized that many methods of obtaining damping in excess of critical may be employed; for example, a very light moving system which is not streamlined or a heavier moving element immersed in liquid could be used. Also large flat parallel plates are efficient dampers and electromagnetic damping has been found satisfactory.

Although various types of dampers may be employed, a preferred from of damper is illustrated in Figures 1, 2 and 3. One damper, generally indicated at D, is mounted above the beam B, while the second damper D1 is located below the beam. The damper D, shown in detail in Figure 3, comprises a lower damper member 47, which is secured to the upper surface of the beam B. This member includes a substantially flat plate 48 having upstanding annular cylinders 49 which are arranged coaxially whereby spaces 50 are provided therebetween. An upper damper member 51 is formed with depending coaxial cylinders 52 which engage within the spaces 50 between cylinders 49. This upper member is secured to the bracket 46 and obviously is attached to the inner casing 11. The cylinders 49 and 52 of the two damper members are properly machined to provide only a few thousandths of an inch clearance therebetween and, as the concentric cylinders move toward each other, the air trapped therebetween can only escape through the small clearance therebetween, with the result that a very high damping action is obtained.

The lower damper is constructed in a manner similar to the upper damper with the damper member 51a being secured to the inner casing 11, while the damper member 47a is secured to the underside of the beam. It is noted that the lower damper D1 has its members tilted as illustrated in Figure 1 so that a plane through the centers of the damper members will pass substantially through the axis of rotation H. Also, the centers of the damper members of the damper D pass substantially through the center of this axis. By so locating the dampers it is evident that an oscillation of the beam will minimize the change in clearance between the cylinders of the dampers.

It is preferably that the upper and lower dampers be made as nearly identical as practical so as to make the damping as symmetrical as possible. Symmetry is important since errors will be minimized by making the damping substantially independent of the direction in which the beam is moving.

With the use of damping many times greater than critical, the movement of the beam becomes sluggish, and it is desirable to have some means of applying a large force to the beam so that its position can be controlled quickly prior to the beginning of a reading operation. It is obviously preferable to begin a reading operation with the beam midway between the stops 44 and 45 so as to minimize the possibility of said beam striking said stops. Any suitable means, such as electric or magnetic means may be employed for applying a large force to the beam to rapidly move the beam into proper position; however, the preferred means is illustrated as a pump 53 which is mounted within the inner casing and has its outlet connected through a tube 54 with the central portion of the upper damper D. The other side of the pump is connected through a tube 55 with the central portion of the lower damper D1. Pump 53 is actuated through a selsyn 56, which is electrically connected through a cable 57 with a driving selsyn 58, the latter being electrically connected to the power lines 42. The control crank 59 of selsyn 58 will obviously control operation of the pump. By operating the pump 53 in the desired manner, air may be pumped into or out of the dampers D and D1 in the desired direction to cause the beam B to be moved into a desired position rapidly so as to place the apparatus in condition for the beginning of a reading operation.

For indicating the position of the beam or element B with respect to the inner casing 11 and outer casing 10 within which said beam is mounted, an indicator housing 56 is secured to the outer housing 10 at a point adjacent that end of the beam which carries the weight 14.

Within the indicator housing is a light source 57 which projects light through a slit 58 formed in the wall of the indicator housing. The slit 58 is aligned with the opening 59 in the housing 10 and an opening 60 in the casing 11, whereby the light projected through the slit 58 may be directed upon a concave mirror 61 which is secured to the weight 14. The light is reflected from the mirror 61 back through the openings 59 and 60 and forms an image of the slit 58 on the phototube 62 mounted in the indicator housing. When the beam is at the midpoint of its travel between the stops 44 and 45, the image reflected by the mirror falls equally upon the cathodes 63 and 64 of the phototube. However, when the beam moves in one direction or the other, one of the cathodes of the phototube receives a greater amount of light and functions to operate an indicator assembly 65 to which the phototube is connected through conductors 66. The indicator assembly includes a microammeter 67 which, as will be explained, provides an indication of the instantaneous beam position, and a second microammeter 68, which provides a smoothed or filtered indication of the beam position. The filtering removes the higher frequencies. It is noted that the two microammeters are provided so that the operator may be aware of the exact instantaneous position of the beam and at the same time will be advised of a smoothed indication of the position of said beam. The instantaneous position indication is used to indicate the possible occurrence of interference between the beam B and its stop while the smoothed position indication is utilized in the reading method.

The particular electrical circuit which includes the phototube 62 and the indicating assembly 65 is illustrated in Figure 4. Referring to this figure, the cathodes 63 and 64 of the phototube are connected to the grids of tubes 69 and 70, respectively, which tubes operate as cathode followers. The cathodes of the tubes 69 and 70 are connected to the microammeter 67 to give the instantaneous beam position and are also connected to the filtering or smoothing circuit consisting of resistors 71 and 72 and condenser 73. The output of the smoothing circuit is connected to the grids of tubes 74 and 75. The output of the tubes 74 and 75 actuate the microammeter 68 to provide a smoothed indication of the position of the beam. By observing the microammeter 67, the operator can be certain that the beam or element B is located at some point between the stops 44 and 45; thus, by proper adjustment of the spring 28, it can be assured that the beam will not engage the stops during a reading operation. The indication on the microammeter 68 which gives a smoothed indication of the position of the beam is employed to determine the time intervals over which the torque of spring 28 is to be averaged to obtain the gravity readings.

Since the element or beam B, which is responsive to gravitational force, is intentionally overdamped and is therefore sluggish in its movement, it is obvious that considerable time would normally be required to permit the beam to settle to an equilibrium position. Ordinarily this excessive length of time can not be tolerated and would render the use of the device completely unsatisfactory. It has been discovered and can be mathematically proven that an accurate reading may be obtained by averaging the torque which is exerted by the spring 28 upon the beam B over a particular time interval, the determination of which time interval will be hereinafter described, and to accomplish this purpose the improved method of measuring and averaging this torque is provided.

For accomplishing a measurement and averaging of the torque of the spring 28, the selsyn crank 43 of the selsyn 40 is secured to the selsyn shaft 40a which, in turn, is fixed to the shaft 76 of an analogue-digital converter 77. This analogue-digital converter is a device which converts the rotation of the shaft 76 into discrete electrical contact combinations; although any suitable converter may be employed, one which has been found satisfactory is a "C-2 digi-coder" which is manufactured by the Fischer & Porter Company. The particular contact combinations are representative of the rotative position of the shaft 76 which, in turn, is representative of the position of the crank 43. Since, as explained, rotation of the shaft actuates selsyn 39 and effects an adjustment of screw 35 to vary the torque on the spring 28, the electrical combinations produced in the converter 77 are, in fact, representative of the torque of spring 28.

The electrical contacts of the converter 77 are connected through a suitable cable 78 with a multipen operation recorder 79, and said contacts function to operate the pens 80 of said recorder to provide a coded record of the position of the selsyn crank 43. The particular multipen operation recorder which has been found satisfactory is one which may be purchased on the open market and which is identified as a 20-pen Esterline-Angus recorder. The converter 77 has four digits and is capable of counting up to 10,000; each digit of the converter 77 employs four electrical contacts for coding, with each contact controlling one pen in the multipen operation recorder. The four pens of the recorder which are representative of each digit may be properly decoded in accordance with well known practice to indicate the particular digit which is represented. In this type of recorder, the pens 80 are electromagnetically operated in either an off or on position. The recorder is driven by a synchronous motor from the power lines 42 and a continuous record of the torque exerted by spring 28 is thus obtained. The code record is indicated by the lines 81 on the chart 82 of the recorder 79.

In addition to the code record of the torque which is exerted by spring 28, it is also necessary to record the times on the chart 82 at which the averaging of the torque is to begin and end. These particular instants of time are recorded on the same chart 82 by a pen 83 which forms a line 84 on said chart. Pen 83 is actuated by a manually operated switch 85 and each time that the switch 85 is closed a time mark 86 is formed on the chart. It is noted that the record includes the torque exerted by the spring 28 and also includes the time interval marks 86.

As will hereinafter appear, the time marks 86 are formed on the chart whenever the smoothed indication of the beam or element B passes a predetermined reference position. Any two time marks define a time interval over which the torque of spring 28, as indicated by the measurements 81, can be averaged to obtain a gravity reading. In order to obtain an average of the torque which was exerted over a selected time interval, the record chart 82 is analyzed with respect to desired time marks 86. During this time interval a table is made showing the various positions which selsyn crank 43 had assumed and the time it remained at each such position; from these figures the average value of the crank position or the average value of the torque exerted by spring 28 during this time interval can be calculated. This average value is then multiplied by a scale factor for the particular gravity meter and the product so obtained is the correct gravity reading. It will be hereinafter shown mathematically that a correct gravity reading may be obtained in this manner.

In the operation of the apparatus, said apparatus is mounted within the submarine and due to its overdamping is not adversely affected by the motion of the submarine. To begin a reading, the pump 53 is first actuated to rapidly move the beam B to approximately the midpoint of its range between the stops 44 and 45, as indicated on the microammeters 67 and 68. The operator then actuates the selsyn 40 through the crank 43 to operate selsyn 39 and adjusting screw 35 to thereby control the torque exerted by the spring 28 in a manner to satisfy the following requirements: (1) The beam B should not engage either stop 44 or 45, as indicated by the microammeter 67, at any time during the reading operation; for example, if microammeter 67 indicates that beam is in danger of striking the upper stop 44, spring torque should be decreased; (2) the smoothed indication of the beam position, as determined from microammeter 68, should not move rapidly at either the beginning or end of the observation; and (3) the smoothed indication of the beam positioned, as determined from the microammeter 68, should be made to coincide occasionally with a predetermined reference position. For the sake of clarity it will be presumed that the predetermined reference position which has been selected is at the midpoint of travel of the beam B between its stops.

To satisfy the third requirement as above stated, and assuming the smoothed indication of the beam B to be below the predetermined reference point, the operator rotates the crank 43 to increase the torque caused by spring 28 to cause the smoothed indication of the beam to move in an upward directon past the predetermined reference point. As it passes this predetermined reference point, which is assumed to be midpoint, the operator closes switch 85 to indicate a time mark 86 on the chart. Of course at this time the pens 80 are recording the position of the selsyn crank 43 and are therefore recording the torque exerted by spring 28.

Thereafter the operator adjusts selsyn crank 43 to reduce the torque exerted by spring 28 so that the beam will move downwardly. At the instant that the smoothed indication of the beam in its downward travel passes the predetermined reference point, which is assumed to be midpoint of its travel, the operator again closes switch 85 to make a second time mark 86 on the chart. Between these two instants of time the recorder has been recording the torque exerted by spring 28 and by averaging this torque, as above explained, which was exerted between these instants and then multiplying by the scale factor, the actual gravity reading is obtained. In actual practice the smoothed indication of the beam is caused to traverse or pass the predetermined reference point a number of times so that averages over each time interval or the average over the several time intervals may be obtained. It has been found preferable to obtain the average over the time interval which extends from the first time mark made on the chart to the final time mark made on the chart, since this would provide the average over the longest observation period.

Experience has shown that usually 20 to 30 minutes are employed in taking a gravity meter reading in a submarine; this time has been found desirable because submarine motion is quite irregular and enough time should be allowed to average out the irregularities. When there is no submarine motion or when the motion is regular or of small magnitude, the foregoing reading method is extremely fast; when the motion is irregular, the method avoids any loss of time because practically the complete record can be used in obtaining the average. The reading method also gives a result which does not depend upon estimates made by the operator and is therefore a very objective method. Although the method has been described as employing the midpoint of travel of the beam as the predetermined reference point, it will be shown that any point in the path of travel of the beam may be selected as the predetermined reference point. Such point can be selected on the scale of the microammeter 68 and each time that the pointer traverses or passes this point, the time marks 86 are made upon the chart. As above described, the operator closes the switch 85 to make the time marks 86 whenever the smoothed indication of the beam position, as indicated on the microammeter 68, coincides with the predetermined reference position.

In connection with the reading method, attention is directed to a refinement which assures extreme accuracy. It is noted that since the operator closes the switch 85 in accordance with the indications of microammeter 68, which is responsive to the smoothing or filtering circuit, a slight time delay is introduced in the actuation of the timing pen 83. To compensate for this time delay, the timing pen 83 may be made slightly longer than the other pens 30, so that the timing mark appears on the record as though it were made slightly sooner or in advance of the time that it actually was placed on the record. This compensation will provide for extreme accuracy in the final record.

Figures 5, 6:
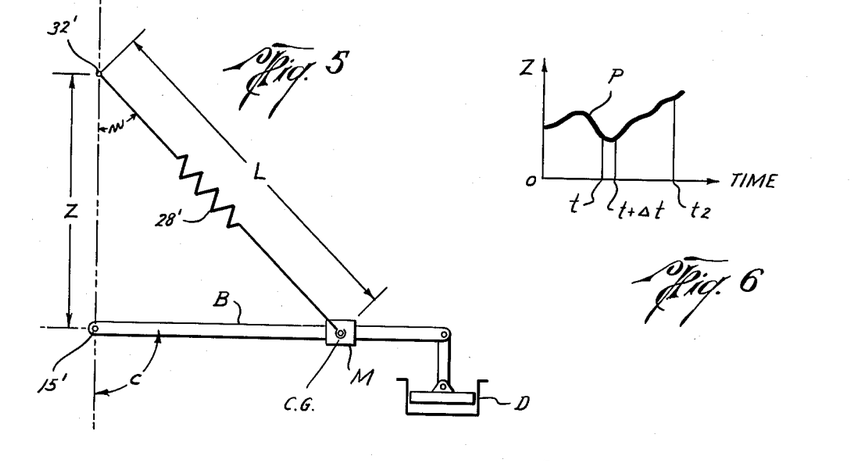
Figure 5 is a diagrammatic view of a gravity meter beam suspension of high displacement sensitivity.
Figure 6 is a graph used in the derivation of the equation to be satisfied by the analogue computers.

To explain the mathematical basis for the reading method used with the apparatus, reference is made to Figure 5 which illustrates diagrammatically a gravity meter of very high displacement sensitivity, such meter being of the type generally illustrated in Figure 1 and more fully disclosed and described in prior Patent No. 2,293,437. The equations of motion can be derived as hereinafter explained. The mathematics will be carried out without considering the effect of any smoothing of the beam position indication. After the derivation is completed, the effect of smoothing or filtering will be considered.

The mass M fixed to the beam B is pivoted about a horizontal axis of oscillation 15'. The mass M is suspended by the zero length spring 28' which is fixed to a support 32'. A zero length spring is a spring which exerts a force directly proportional to the distance between its ends or, in other words (1) $$F = kL$$

where $F$ = the force exerted by the spring,
$L$ = the distance between the ends of the spring, and
$k$ = the spring constant.

Zero length springs are described in prior Patent No. 2,293,437. Non-zero length springs satisfy an equation similar to Eq. 1; the difference is that for non-zero length springs, L is not the distance between the ends of the spring but merely the distance the spring has been stretched.

In Figure 5 the point 32' lies vertically above axis 15' and at a distance z above 15'. The distance z is assumed to be adjustable by the gravity meter operator. We will assume that the beam B is weightless except for the concentrated mass M at its end. The spring 28' is attached to the beam at the center of gravity C—G of the mass. We will let $m$ = the size of the mass M.

A damper D is fixed to the mass and operates to damp the motion of the beam B. As shown in Figure 5:

$a$ = the distance from 15' to CG
$L$ = the length of the zero length spring
$z$ = the distance from 15' to 32' (a variable)
$p$ = the angle the beam B makes with the vertical measured in a counterclockwise direction
$n$ = the angle spring 28' makes with the vertical
$g$ = the acceleration due to gravity, taken as a positive quantity
$\ddot{y}$ = the vertical acceleration of the submarine measured in an upward direction. (Dots are used to indicate differentiation with respect to time.)

With these assumptions the torque produced on the beam by gravity and the vertical acceleration of the submarine is (2) $$T_m = -m(g+\ddot{y})a \sin p$$

The torque produced by the spring on the beam is (3) $$T_s = kLz \sin n$$

However, by the law of sines (4) $$\frac{\sin n}{a} = \frac{\sin p}{L}$$

Substituting the value of sin $n$ from Eq. 4 into Eq. 3 gives (5) $$T_s = kaz \sin p$$

The differential equation of motion of the beam is therefore (6) $$-ma^2\ddot{p} - F\dot{p} - m(g+\ddot{y})a \sin p + kaz \sin p = 0$$

where $F$ = a viscous damping constant.

Eq. 6 can be reduced to (6') $$a\ddot{p} + \frac{F}{ma}\dot{p} + \sin p \left(g+\ddot{y} - \frac{k}{m}z\right) = 0$$

Eq. 6' can be further simplified as follows. In practice the gravity meter is used with $p$ closely equal to 90°; therefore (7) $$\sin p = 1 - q^2$$

when $$q = p - \frac{\pi}{2} \text{ radians}$$

In Eq. 7, $q^2$ is very small. Also in practice z is adjusted to make the parentheses in Eq. 6' small; therefore the product of the parentheses and $q^2$ can be neglected. This reduces Eq. 6' to (8) $$a\ddot{p} + \frac{F}{ma}\dot{p} + g + \ddot{y} - \frac{k}{m}z = 0$$

If we integrate Eq. 8 with respect to time between the times $t_1$ and $t_2$ we obtain (8') $$a\int_{t_1}^{t_2}\frac{d\dot{p}}{dt}dt + \frac{F}{ma}\int_{t_1}^{t_2}\frac{dp}{dt}dt + g(t_2-t_1) + \int_{t_1}^{t_2}\ddot{y}\,dt - \frac{k}{m}\int_{t_1}^{t_2}z\,dt = 0$$

If we let $\bar{\ddot{y}}$ = the average value of $\ddot{y}$ between $t_1$ and $t_2$ and $\bar{z}$ = the average value of $z$ between $t_1$ and $t_2$ then Eq. 8 becomes (9) $$\frac{a[\dot{p}(t_2)-\dot{p}(t_1)]}{t_2-t_1} + \frac{F[p(t_2)-p(t_1)]}{ma(t_2-t_1)} + g + \bar{\ddot{y}} - \frac{k}{m}\bar{z} = 0$$

When taking gravity readings in a submarine the depth of the submarine is usually controlled to make the rate of change of depth of the submarine small at the beginning and end of the observation. Since an observation takes about 20 or 30 minutes in a submarine, the wave motion averages out and $\bar{\ddot{y}}$ can be taken to equal zero. An inspection of Eq. 9 will therefore show that if a reading scheme can be devised that will make the first two terms negligible, the value of gravity will be given by $$\frac{k}{m}\bar{z}$$

The second term in Eq. 9 can be made zero by beginning and ending the reading, or averaging time, at the same value of $p$; $p(t_2)$ then equals $p(t_1)$ and the second term vanishes.

Let us now consider the first term in Eq. 9. This term can be neglected if $\ddot{p}$ can be kept sufficiently small. The order of magnatude of $\ddot{p}$ can be obtained from Eq. 8 by noting that the $\ddot{p}$ term can be neglected compared to the $\dot{p}$ term when the damping coefficient F is very large compared to $ma^2$. We then have (10) $$\dot{p} = \frac{ma}{F}\left(g+\ddot{y}-\frac{k}{m}z\right)$$

Eq. 10 shows that $\bar{\dot{p}}$ can be made arbitrarily small by choosing a sufficiently large value of F provided, of course, that the term in the parentheses is limited. The magnitude of the term in the parentheses is determined by how well the operator adjusts z to keep $\bar{\dot{p}}$ small; it was found experimentally that an operator has no trouble in keeping the average value of the term in the parentheses less than $10^{-4}$ g. From this information a minimum value for the damping can be calculated. Actually many times more damping than this minimum was used in the submarine gravity meter in order to limit the motion of the end of the beam B to about .02″ when the submarine motion had a double amplitude of 8″ and a period of 10 sec. In the actual submarine gravity meter the first term of Eq. 9 is therefore completely negligible.

Omitting the first two terms in Eq. 9 gives for the submarine gravity meter $$(11) \qquad g = \frac{k}{m} \bar{z}$$

when $\bar{z}$ is the average of $z$ taken from a time $t_1$ to a time $t_2$ at which two times the values of $p$ are equal. In Eq. 11, $z$ corresponds to the rotation of selsyn crank 43 from a given starting position, which is recorded on recorder 79. Also in Eq. 11, $$\frac{k}{m}$$

corresponds to the gravity meter calibration factor.

In order to better understand Eq. 11 and Eq. 9 from which it was derived, it is desirable to study the meaning of each term in the equations. A study of the first term of Eq. 9 will show that it is the average acceleration of the beam relative to the gravity meter support during the time interval from $t_1$ to $t_2$. It has been shown that this term is negligible because of the high damping; the high damping restricts velocities and accelerations to small values.

A study of the second term of Eq. 9 shows that it is equal to the damping constant $(F/ma^2)$ times the average velocity of the beam relative to the gravity meter support during the time interval from $t_1$ to $t_2$. This average velocity can be made zero by choosing $t_1$ and $t_2$ properly or the term can be evaluated from the record of the beam position and used in the equation.

The third term, of course, is gravity. The fourth term is the vertical acceleration of the submarine during the time interval from $t_1$ to $t_2$. This term has been shown to be negligible if the submarine is operated at a practically constant depth, but this term also can be evaluated if desired from the depth record of the submarine. The last term represents the average torque exerted by the spring during the time interval from $t_1$ to $t_2$.

Neglecting the first and third terms as before, Eq. 9 can be written as $$(9^1)$$

$g =$ (constant) (spring torque averaged from $t_1$ to $t_2$)

$$+ \frac{F}{ma^2} \text{ (beam velocity averaged from } t_1 \text{ to } t_2\text{)}$$

It is interesting to note that there is no term in Eq. $9^1$ involving the beam position. The absence of a beam position term is due to the fact that a zero length spring was used as shown in Fig. 5; a beam position term would be present if the spring 28′ were not a zero length spring. The zero length spring permits infinite sensitivity (theoretically), which means that the beam is equally well balanced at any position. It is like a ball on a horizontal flat table. Of course, in practice it is impossible to obtain an infinite sensitivity but the sensitivity can be made so high that, to the accuracy required, the beam position term in Eq. $9^1$ can be neglected over the permissible range of beam motion. Of course, it would be possible to evaluate the beam position term if it were not negligible.

The effect of the extremely high damping and high sensitivity on Eq. $9^1$ is therefore to eliminate a term proportional to beam position, or average beam position, and to replace it by a term proportional to the average beam velocity during the chosen time interval. The highly over-damped gravity meter therefore measures gravity not by where the beam is but by how fast it is moving and, of course, by how much spring torque the spring is exerting.

Gravity can be measured by evaluating the two terms of Eq. $9^1$, but a particularly simple way to do it is to choose a time interval $t_1$ to $t_2$ over which the average beam velocity is zero. The second term of Eq. $9^1$ is then zero and Eq. 11 is obtained.

Let us now consider the improvement which can be achieved by using a smoothed or filtered indication $\bar{p}$ of the beam position instead of the instantaneous beam position $p$. The disadvantage of using the instantaneous beam position is that it oscillates considerably because of wave actions on the submarine. There are therefore many time intervals which begin and end at equal values of $p$. Obviously a reading can be taken over each of these intervals and the mean of the readings can then be calculated. It is much simpler, however, to do much of the averaging first by filtering the higher frequencies out of $p$. This gives a filtered or smoothed indication $\bar{p}$ of the beam position, which is used in place of $p$ to determine intervals over which to average $z$. The averaging intervals extend from a time $t_1$ to a time $t_2$ at which two times the smoothed values $\bar{p}$ are equal.

In the determination of the gravity reading by the method and apparatus described, the recorder 79 records the torque exerted by the spring 28 and the times that the smoothed indication of the position of the beam coincides with a predetermined reference point. With this information the gravity meter reading may be calculated by averaging the spring torque between any two recorded instants of time. In order to eliminate the foregoing calculations, it may be desirable to provide an analogue computer and such computer is within the scope of this invention.

For the purpose of clearly explaining the construction of such an analogue computer, it is believed helpful to first derive the mathematical equations which must be satisfied. In Figure 6, a plot P of the distance $z$ of Figure 4 is plotted against time. As previously mentioned, $z$ is proportional to the setting of selsyn 40 or to the torque exerted by the spring 28 in Figure 1.

In this derivation it is assumed that the smoothed indication of the beam position coincides with the predetermined reference position at time 0 and at time $t_2$ in the illustration of Figure 6. The time 0 is used in place of $t_1$ merely for simplicity. We wish to obtain an expression for the average value $\bar{z}(t)$ of $z$ averaged from the time 0 to any other time $t$. This average $\bar{z}(t)$ will give the correct gravity reading when $t = t_2$ or at any other time when the smoothed indication of the beam position coincides with the predetermined reference position.

Figures 7, 9:
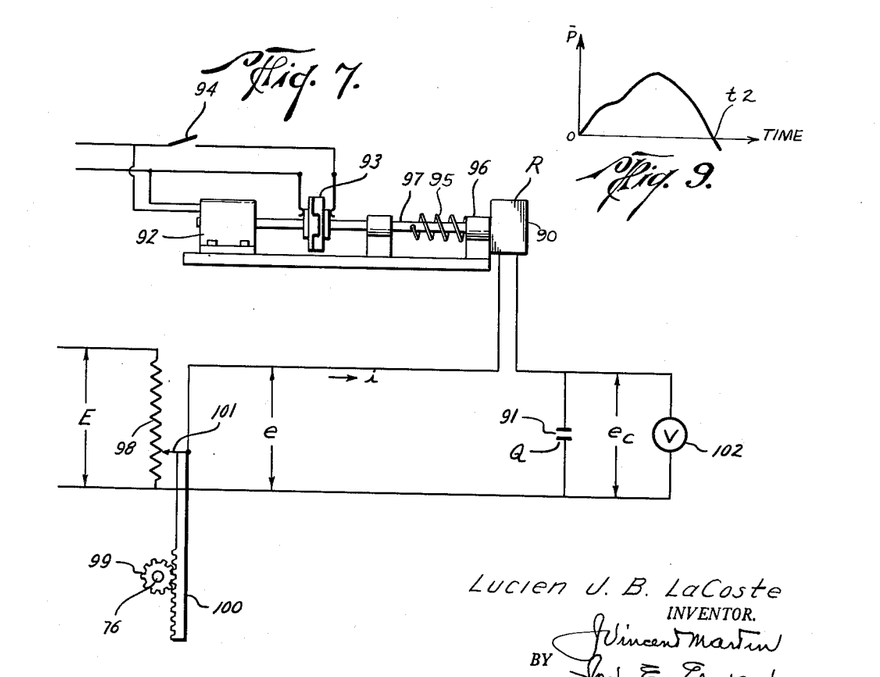
Figure 7 is a diagrammatic illustration of one type of analogue computer for automatically performing the required calculations.
Figure 9 is a graph illustrating the derivation of the equation relating to the analogue computers.

To further explain the derivation, reference is made to Figure 9, wherein the ordinate is $\bar{p}$, the smoothed indication of the beam position; in Figure 6, the ordinate is $z$ which is proportional to the selsyn setting or to the torque exerted by the spring 28.

As previously explained, $\bar{z}$ or the average value of $z$, does not in general give the correct gravity reading. It does give the correct gravity reading only when averaged between certain instants of time. These instants of time occur when the smoothed indication of the beam position of Figure 9 coincides with some predetermined reference position. Using the predetermined reference position shown in Figure 9, the correct instants of time are 0 and $t_2$. Therefore, the selsyn setting $z$ of Figure 6 is averaged between the instants of time 0 and $t_2$ to obtain an average $\bar{z}$ of $z$ which is proportional to the correct value of gravity.

In order to obtain an expression for $\bar{z}(t)$, we shall equate two expressions for the area under the curve P between the $z$ axis and the ordinate $t+\Delta t$. Equating these two expressions gives $$(12) \quad t\bar{z}(t+\Delta t)+\Delta t\bar{z}(t+\Delta t)=t\bar{z}(t)+\Delta t z(t)$$

In Eq. 12 the parentheses are used to indicate the value of $t$ at which the variables are evaluated. Eq. 12 can be reduced to $$(13) \quad \frac{\bar{z}(t+\Delta t)-\bar{z}(t)}{\Delta t}=\frac{z(t)-\bar{z}(t+\Delta t)}{t}$$

If we let $\Delta t$ approach zero, Eq. 13 becomes $$(14) \quad \frac{d\bar{z}}{dt}=\frac{z-\bar{z}}{t}$$

In Eq. 14 the arguments in parentheses are omitted because they are all equal to $t$. Eq. 14 can also be written as $$(15) \quad \frac{d\bar{z}}{z-\bar{z}}=\frac{dt}{t}$$

A simple analogue computer for performing the computation indicated by Eq. 15 is shown in Figure 7. In that figure, a D.C. voltage $e$ proportional to $z$ is applied across a linearly variable resistor 90 and a condenser 91 in series. It will be shown that the voltage $e_c$ across the condenser is proportional to $\bar{z}$ when the capacitance Q of condenser 91 is properly chosen and the resistance R of the variable resistance 90 is increased linearly with time. The linear increase in resistance is accomplished by using a synchronous motor 92 to drive the variable resistance. The drive is through an electromagnetic clutch 93, which can be energized or released by switch 94. A spring 95 is fixed to the frame 96 and to the driving shaft 97 so that when the clutch is released, the spring tension will return resistor 90 to its position of zero resistance. The operator energizes the clutch to start variable resistance 90 increasing the resistance R linearly from zero resistance when the gravity meter beam position coincides with the predetermined reference position. We have indicated this time as $t=0$. Resistance R therefore satisfies the relation $$(16) \quad R=K_1 t$$

when $K_1$ is a constant.

The current $i$ through R is therefore given by $$(17) \quad i=\frac{e-e_c}{K_1 t}$$

but $$(18) \quad i=\frac{Qde_c}{dt}$$

therefore $$(19) \quad \frac{Qde_c}{dt}=\frac{e-e_c}{K_1 t}$$

or $$(20) \quad \frac{de_c}{e-e_c}=\frac{dt}{QK_1 t}$$

We will choose a condenser to make $$(21) \quad QK_1=1$$

then $$(22) \quad \frac{de_c}{e-e_c}=\frac{dt}{t}$$

Comparing Eq. 22 with Eq. 15, we see that they will be identical if we take $e=K_2 z$ and $e_c=K_2\bar{z}$ where $K_2$ is any constant. A potentiometer 98 for providing the voltage $e$ proportional to the rotation ($z$) of the shaft 76 is shown in Figure 7. Selsyn shaft 76 has a pinion 99 fixed on it. This pinion engages rack 100 which moves the arm 101 of the linear potentiometer 98. The voltage E is a constant D.C. voltage, therefore $e=K_2 z$.

A voltmeter 102 is used to read $e_c$ from which $\bar{z}$ can be calculated. The resistance of potentiometer 98 should be small compared to the resistance of 90 to avoid loading errors.

Figure 8:
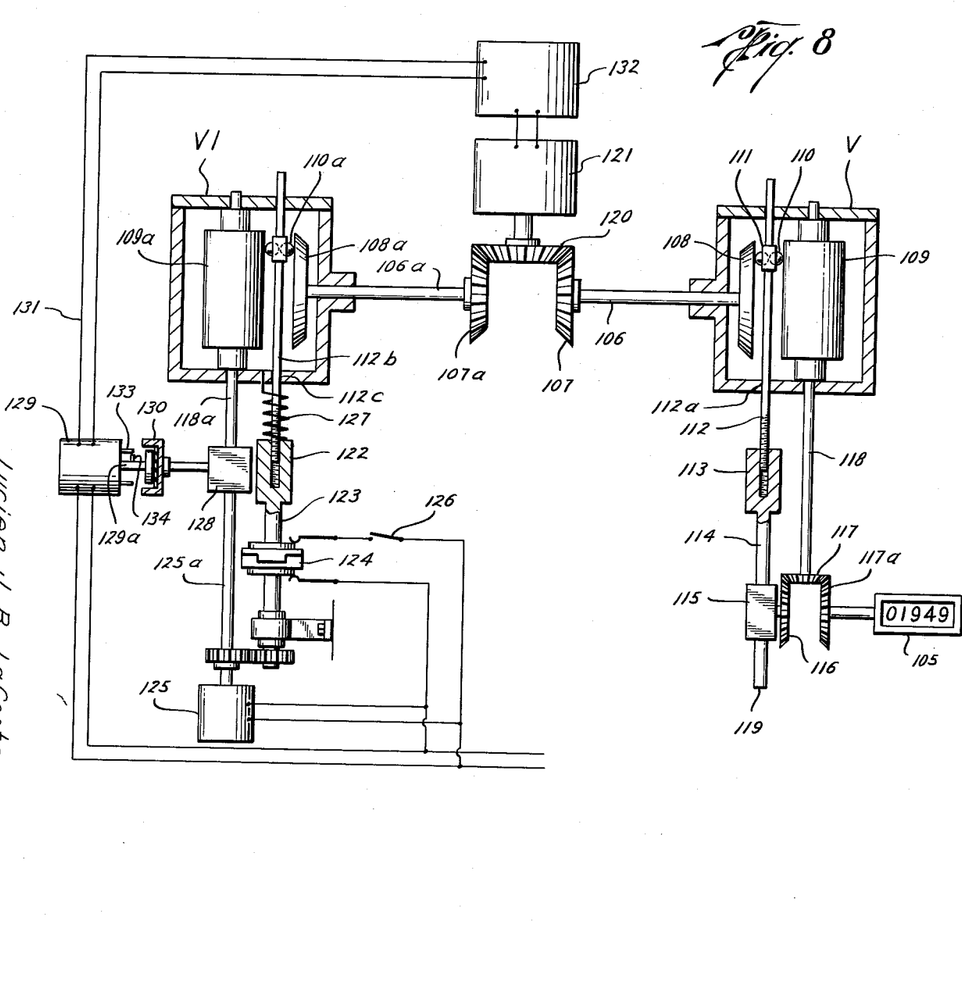
Figure 8 is a diagrammatic view of a modified form of analogue computer.

The analogue computer illustrated in Figure 7 is simple in construction and operates satisfactorily; however, it has the disadvantage that it can not cover an extremely large range without losing accuracy. In Figure 8 a modified form of analogue computer, which is not subject to this disadvantage, is illustrated. This computer utilizes a pair of variable speed drive units V and V1, each of which may be termed an integrator. This particular construction of the integrator units is well known since this type of drive unit may be purchased on the open market; for example, integrators manufactured by the Sperry Gyroscope Company or Librascope have been found satisfactory.

The unit V controls the operation of a counter 105 which will provide a numerical representation of the average torque of the spring 28. The unit V is driven by a servo motor 121, the speed of which is properly controlled by a constant speed motor and the variable drive unit V1. As will be hereinafter described in detail, an electric switch is closed at time 0 (Figure 6). This results in the servo motor 121 running at a speed inversely proportional to the time $t$ which has elapsed since the closing of said switch. This is the correct input speed for the variable speed drive unit V; this unit is geared to average the rotation $z$ of a shaft identified as 119 (but which may be shaft 76 of Figure 1 when the computer is used with the apparatus of Figure 1) and the average appears on counter 105. The rotation $z$ is proportional to the torque exerted by spring 28.

Referring to the unit V, such unit includes a main drive shaft 106 having a drive gear 107 on its outer end. When the shaft 106 is rotated a drive disk 108 within the unit V is rotated. A driving connection is made between disk 108 and a cylinder 109 through driving balls 110 which are mounted in a suitable frame 111 secured to a longitudinal angular rod 112. The lower end of the rod 112 has a threaded connection with a nut 113 and this nut is adapted to be rotated by a shaft 114 which extends from a differential 115. One input of the differential 115 is driven through gears 116 and 117 of the shaft 118 of the cylinder 109. The other input of the differential 115 is driven by the shaft 119. The rotation of this latter shaft is proportional to the torque exerted by the spring 28 in Figure 1, which torque has been indicated as $z$ in the equations. The directions of rotation of the shafts 118 and 119 are such that the output of the differential on shaft 114 is proportional to their difference, $z-w$, where $z$ is proportional to the torque exerted by spring 28 and $w$ represents the rotation of the cylinder shaft 118. Since the nut 113 is fixed to shaft 114 and since rod 112 extends through an angular opening 112a in the unit housing so as to render this shaft non-rotatable, it is evident that the differential will function to cause the shaft 112 to be moved radially of the driving disk 108 to locate the driving balls 110 at a distance from center of the disk 108 which distance is proportional to $z-w$.

The position of the driving balls 110 with respect to the center of the disk 108 determines the speed ratio between the disk and the cylinder 109 which is driven thereby. For a given speed of the disk, the cylinder speed will be zero when the driving balls 110 are at the center of the disk and the speed of the cylinder increases linearly as the balls move toward the periphery of said disk. As above noted, through the differential 115 the rod 112 is translated with respect to the driving disk 108. The speed of the disk 108 and the position of the driving balls 110 determine the speed of the cylinder 109 and its shaft 118. The counter 105 is driven by the cylinder shaft 118 and gear 117 through a gear 117a, and the reading of the counter will be controlled by rotation of the cylinder 109.

As will be hereinafter shown, this reading is equal to an average of z (which is proportional to the torque exerted by the spring 28) and will provide a correct gravity reading when the position of the beam B coincides with a predetermined reference position.

Referring to the unit V1, this unit includes a drive disk 108a, driving balls 110a and a driven cylinder 109a. The disk 108a is carried by a shaft 106a which meshes with a gear 107a. The gears 107 and 107a are driven at the same speed by a gear 120, which is rotated by the servo motor 121. The driving balls 110a of the unit V1 are carried by an angular rod 112b, which extends through an angular opening 112c in the housing of the unit V1.

For translating or controlling the position of the rod 112b, the lower end of said rod has a threaded connection with a nut 122, which nut is carried by a shaft 123. An electric clutch 124 is connected in the shaft 123 and functions to set up a driving connection between the nut 122 and a constant speed motor 125. An electrical switch 126 controls the flow of electrical current to the electromagnetic clutch 124 and when the switch is closed a driving connection is effected between the motor and the nut 122. When the switch 126 is open, a coil spring 127, which has one end secured to the housing of the unit V1 and its other end fastened to the nut, functions to rotate the nut to a position which will locate the driving balls 110a at substantially the center of the driving disk 108a.

In order to cause the cylinder 109a of unit V1 to rotate at the same constant speed as the motor 125, said motor drives one input of a differential 128, while the other input of said differential is driven by the shaft 118a of the cylinder 109a. The differential 128 operates to supply the difference in these two rotations to an error indicator assembly 129, the connection being made through a friction clutch 130. Conductor connections 131 provide an electrical connection between the error indicator assembly and a servo amplifier 132 which is electrically connected with the servo drive motor. The error indicator assembly 129 may be a selsyn, potentiometer or other type of error indicator.

In the operation of the unit V1, the driving balls 110a are maintained at the center of the disk by the spring 127 when the switch 126 is open. In such position an infinite speed is required of the servo motor 121; obviously this is not possible nor is it necessary for satisfactory operation of the apparatus. Provisions are therefore made to keep the servo motor operating at its maximum speed whenever an infinite speed is indicated as required, and such provisions consist of driving the error indicator through the friction clutch 130 and adding stops 133 on the indicator housing, together with an arm 134 on the shaft 129a of indicator 129. The coaction between stops 133 and arm 134 limits the motion of the arm on the shaft 129.

When the switch 126 is closed, the driving balls 110a are gradually moved from the center of the disk through translation of the rod 112b and such movement is at a uniform speed. By controlling the pitch of the threaded connection between the nut 122 and rod 112b, the translation or movement of rod 112 may be controlled. The disk 108a drives the cylinder 109a through the balls 110a. The rotation of the cylinder, together with rotation of the shaft 125a of the constant speed motor, actuates the differential 128 to cause the error indicator 129 to function. The error indicator adjusts the speed of the servo motor 121 so that the rotation of the cylinder 109a is the same as the speed of the motor 125. The cylinder 109a is thus driven at a constant speed, and since the rod 112b is translated at a uniform rate the servo motor speed must vary inversely proportional to the time which has elapsed after closing of the switch 126. The rotation of the servo motor 121 is thereby gradually reduced with the result that the unit V1 reduces the speed of rotation of the disk 108 of the averaging unit V at the same rate.

When the averaging operation first begins, the disk 108 of unit V operates at a relatively high speed of rotation so that at the beginning of the operation averaging is over a relatively short period of time. However, as the reading interval continues it is necessary that the averaging be over a longer period of time and the speed of rotation of disk 109 is gradually reduced to accomplish this purpose.

Tracing the operation of the computer illustrated in Figure 8 to show that it satisfies Eq. 15, it has been shown that cylinder 109a of the variable speed drive unit V1 turns at a constant angular speed equal to the angular speed of the synchronous motor 125 (except when this requires excessive servo motor speed). When switch 126 is closed, the driving balls 110a start moving away from the center of the disk 108a at a uniform speed. Therefore, if the time $t$ is desigated as equal to zero ($t=0$) when switch 126 is closed, then the ratio of cylinder speed 109a to the angular speed of disk 108a is equal to $K_1 t$ when $K_1$ is a constant depending on the dimensions of the variable speed drive, the pitch of the thread 127 and other factors. But since the speed of cylinder 109a is a constant which we shall call $N_1$, the angular speed of disk 108a will be $$(23) \qquad \dot{v}=\frac{N_1}{K_1 t}$$

The angular speed of disk 108 will therefore be equal to $$\frac{N_1}{K_1 t}$$

also. The angular speed of cylinder 109 will depend on the distance the balls 110 are from the center of disk 108. This distance has been shown to be directly proportional to $z-w$, where $z$ represents a shaft rotation proportional to the distance $z$ in Figure 5 and $w$ represents the shaft rotation of cylinder 109. The ratio of the angular speed of cylinder 109 to the angular speed of disk 108 is therefore $K_3(z-w)$ and the angular speed of cylinder 109 is $$(24) \qquad \dot{w}=\left(\frac{N_1}{K_1 t}\right) K_3(z-w)$$

If the synchronous motor (125) speed $N_1$ and various gear ratios are chosen properly it is possible to make $$(25) \qquad \frac{N_1 K_3}{K_1}=1$$

Eq. 24 therefore becomes $$(26) \qquad \frac{dw}{dt}=\frac{z-w}{t}$$

or $$(27) \qquad \frac{dw}{z-w}=\frac{dt}{t}$$

An inspection of Eq. 27 shows that it is identical to Eq. 15 if we choose $$(28) \qquad w=\bar{z}$$

It is thus evident that the reading on the counter 105 is equal to the average of $z$, which is the correct gravity reading when the position of the beam B coincides with the predetermined reference position.

No specific structure for leveling the gravity meter has been disclosed or described herein because such leveling may be in accordance with well established practice. Where the instrument is to be used as a remote controlled underwater gravity meter which is lowered to rest on the bottom of the ocean, the instrument may be leveled in any desired manner; for example, with the arrangements shown in my previous Patents No. 2,589,709 and 2,589,710.

Where the gravity meter is used in a submarine, the submarine gravity meter may be supported upon a stabilized platform or support such as is disclosed and described in my co-pending patent application Serial No. 459,489, now Patent No. 2,964,948. The particular stabilized platform described in said co-pending application makes use of a very long period inertia pendulum as the element for achieving stabilization; other types of stabilized platforms have employed gyros as the indicators for achieving stabilization and any desirable type may be used with the present invention.

When the submarine gravity meter is supported on a stabilized platform its indications are not affected by horizontal accelerations in the submarine, provided such horizontal accelerations are not sufficient to cause the beam B to contact any other part of the apparatus. The possibility of the beam B striking the other parts of the apparatus is substantially eliminated with the mounting shown in Figure 1 because, as heretofore pointed out, the use of the several tension members extending in different directions prevents substantially all motion of the beam except rotation about its horizontal axis H.

Instead of supporting the submarine gravity meter upon a stabilized platform, said meter may be mounted in the manner described in the previously mentioned co-pending application Serial No. 459,489, now Patent No. 2,964,948, wherein it is disclosed that the horizontal accelerations may be measured and their effect upon the apparent gravity indications calculated so that corrections may be made for the error.

The foregoing disclosure and description of the invention is illustrative and explanatory thereof, and various changes in the size, shape and materials, as well as in the details of the illustrated construction may be made, within the scope of the appended claims, without departing from the spirit of the invention.

What I claim is:

1. A force-measuring apparatus including, a support, an element movably mounted on the support and adapted to respond to the force to be measured, a counteracting force means connected to the element and applying a force to said element in a direction opposite to that which is applied by the force being measured, means for varying said counteracting force to alternately more than counterbalance and then less than counterbalance the force to be measured to cause the element to move past a predetermined reference position with respect to the support a number of times, damping means associated with the element for providing damping many times greater than critical between the element and support, and means for recording the force which is exerted by the counteracting force as a function of time whereby the average force exerted by the counteracting force between any two instants of time that the position of the element coincides with the predetermnied reference position may be determined.

2. A force-measuring apparatus including, a support, a movable element mounted within the support and responsive to the force to be measured, counteracting force means connected with the element and applying a force to the element in a direction to counterbalance the force to be measured, means for varying the counteracting force means to control the motion of the movable element relative to the support, damping means associated with the element for providing damping between the element and its support, said damping being many times greater than the optimum damping needed for quickly suppressing transient motions of the movable element, means for indicating the position of the movable element relative to the support and measuring the force exerted by the counteracting force means to furnish information from which the force to which the element is responsive may be ascertained.

3. A force-measuring apparatus as set forth in claim 2, wherein the damping means comprises a damper member fixed to the support and a co-acting damper member fixed to the movable element, each damper member consisting of a plurality of coaxial cylinders with the cylinders of one damper member being disposed within the annular spaces between the cylinders of the other damping member.

4. A force-measuring apparatus as set forth in claim 2, wherein the damping means comprises a damper member fixed to the support and a co-acting damper member fixed to the movable element, each damper member consisting of a plurality of coaxial cylinders with the cylinders of one damper member being disposed within the annular spaces between the cylinders of the other damping member, and means for applying a second force to the element for effecting a rapid motion thereof comprising a pump connected to the damper members for introducing or removing air from the area between the interengaging cylinders of said damper members.

5. A force-measuring apparatus including, a support, a movable element mounted within the support and responsive to the force to be measured, counteracting force means connected with the element and applying a force to the element in a direction opposite to the force to be measured, means for varying the counteracting force means to control the motion of the movable element relative to the support, damping means including a damping fluid associated with the element for providing damping many times greater than critical between the element and its support, means for measuring the force exerted by the counteracting force means, and means to indicate the position of the movable element relative to the support.

6. A force-measuring apparatus including, a support, a movable element mounted on the support and responsive to the force to be measured, counteracting force means connected with the element and applying a force to the element to counterbalance the force to be measured, means for varying the counteracting force means to control the motion of the movable element relative to the support, damping means associated with the element for providing damping many times greater than critical between the element and its support, means for measuring the force exerted by the counteracting force means to furnish information from which the force to which the element is responsive may be ascertained, means for applying a second force to the movable element to quickly control the motion of said element when rapid movement of the element is desired, and means for indicating the position of the movable element relative to the support.

7. A force-measuring apparatus including, a support, an element movably mounted on the support and adapted to respond to the force to be measured, a counteracting force means connected with said element and applying a force to said element in opposition to the force being measured, indicating means for simultaneously indicating the instantaneous position of the element relative to the support and for also providing a smoothed indication of the position of the movable element as effected by the forces acting thereon, means for varying the counteracting force means to control the motion of said movable element relative to the support, damping means associated with the element for providing damping many times greater than critical between said element and the support, and means for measuring the force exerted by the counteracting force means, whereby the force to which the element is responsive may be ascertained.

8. A gravity meter apparatus including, a support, a weight element, a plurality of flexible tension means fixed to said support and to said weight element to support the weight element from the support, one end of each of said tetnsion means lying substantially in a horizontal line to permit oscillation of the weight element about said line as an axis of oscillation, said axis of oscillation being at a substantial distance from the center of gravity of the weight element, adjustable means affixed to said support, spring means extending between said adjustable means and said weight element to counterbalance the torque about said axis produced by the weight element, said adjustable means being calibrated to measure the force exerted by said spring means on said weight element, said weight element being suspended solely by said tension means and by said spring means, all of said tension means being yieldable in length under impact, said tension means extending in at least three substantially different directions to give stability to said axis of oscillation, means associated with the weight element for damping the motion thereof to provide damping many times greater than critical between said weight element and said support, and means to measure the position of said weight element relative to said support.

9. A force-measuring apparatus including, a support, a movable element mounted upon the support and adapted to respond to the force to be measured, counteracting force means connected with said movable element, means for indicating the position of said movable element relative to said support, means for varying said counteracting force means to enable an operator to move the movable element repeatedly past a predetermined reference position relative to the support, damping means providing damping many times greater than critical between the movable element and the support, means for recording the instants of time at which the position of the movable element coincides with said predetermined reference position, means for measuring the force exerted by the counteracting force means, and means for recording the force exerted by the counteracting force means.

10. A force-measuring apparatus as set forth in claim 9, together with means for averaging the force exerted by the counteracting force means between any two instants of time that the movable element coincides with a predetermined reference position in its path of movement.

11. A force-measuring apparatus including, a support, a movable element mounted on the support and adapted to respond to a force to be measured, means for applying damping to the element relative to the support which damping is many times greater than critical, a spring means extending between the support and the element and applying a force which counteracts the force to be measured, means for varying the torque of said spring means to cause the movable element to move past a predetermined reference point in its path of movement a plurality of times, and means for averaging the torque exerted by said spring means between any two instants of time that the position of the element coincides with the predetermined reference position.

12. A force-measuring apparatus as set forth in claim 11, wherein the means for averaging the torque comprises an analogue computer which converts said average torque into an indication of the force to be measured.

13. A force measuring apparatus including, a support, an element movably mounted on the support and adapted to respond to the force to be measured, a counteracting force means connected to the element and applying a force to said element in a direction to oppose the force being measured, means for varying said counteracting force, means for measuring said counteracting force, means for damping said movable element relative to the support many times greater than necessary to prevent natural frequency swinging of the movable element, means for indicating the position of the movable element, and means providing a smoothed indication of the position of the movable element.

14. A force measuring apparatus including, a support, an element movably mounted on the support and adapted to respond to the force to be measured, a counteracting force means connected to the element and applying a force to counteract the force being measured, means for varying said counteracting force, means for measuring said counteracting force, means including a damping fluid for damping said movable element relative to the support many times more than critically, and means for indicating the position of the movable element.

15. A force-measuring apparatus including, a support, an element movably mounted on the support and adapted to respond to the force to be measured, a counteracting force means connected with said element and applying a force to said element in opposition to the force being measured, indicating means for indicating the instantaneous position of the element relative to the support as effected by the forces acting thereon, means for varying the counteracting force means to control the motion of said movable element relative to the support, damping means associated with the element for providing damping many times greater than critical between the element and the support, and means for measuring the force exerted by the counteracting force means, whereby the force to which the element is responsive may be ascertained.

16. A force-measuring apparatus including, a support, an element movably mounted on the support and adapted to respond to the force to be measured, a counteracting force means connected with said element and applying a force to said element in opposition to the force being measured, indicating means providing a smoothed indication of the position of the movable element as effected by the forces acting thereon, means for varying the counteracting force means to control the motion of said movable element relative to the support, damping means associated with the element for providing damping many times greater than critical between the element and the support, and means for measuring the force exerted by the counteracting force means, whereby the force to which the element is responsive may be ascertained.

17. A force-measuring apparatus including, a support, a movable element suspended from the support and adapted to respond to the force to be measured, counteracting force means connected with said movable element, means for indicating the position of said movable element relative to said support, means for varying said counteracting force means to control the motion of said movable element relative to said support, means for measuring the force exerted by the counteracting force means, averaging means for averaging the force measurements made by said force-measuring means, means for selectively operating said averaging means whereby the averaging means will give the average of the measuring means over any desired time interval, and damping means providing damping many times greater than critical between the movable element and the support.

References Cited in the file of this patent
UNITED STATES PATENTS

| | | |
|---|---|---|
| 2,262,165 | Clewell | Nov. 11, 1941 |
| 2,377,889 | La Coste et al. | June 12, 1945 |
| 2,569,816 | Lee | Oct. 2, 1951 |
| 2,569,817 | Wolf et al. | Oct. 2, 1951 |
| 2,589,709 | La Coste et al. | Mar. 18, 1952 |
| 2,674,885 | Silverman | Apr. 13, 1954 |

UNITED STATES PATENT OFFICE
CERTIFICATE OF CORRECTION

Patent No. 2,977,799                                               April 4, 1961

Lucien J. B. La Coste

It is hereby certified that error appears in the above numbered patent requiring correction and that the said Letters Patent should read as corrected below.

Column 17, line 68, after "and" insert -- means for --.

Signed and sealed this 12th day of December 1961.

(SEAL)
Attest:

ERNEST W. SWIDER                                        DAVID L. LADD
Attesting Officer                                             Commissioner of Patents

USCOMM-DC